US008786141B2

(12) United States Patent
Wilson

(10) Patent No.: US 8,786,141 B2
(45) Date of Patent: Jul. 22, 2014

(54) MAGNETIC LINEAR ACTUATOR

(75) Inventor: David E. Wilson, Austin, TX (US)

(73) Assignee: National Instruments Corporation, Austin, TX (US)

( * ) Notice: Subject to any disclaimer, the term of this patent is extended or adjusted under 35 U.S.C. 154(b) by 145 days.

(21) Appl. No.: 13/606,734

(22) Filed: Sep. 7, 2012

(65) Prior Publication Data
US 2013/0264902 A1  Oct. 10, 2013

Related U.S. Application Data

(60) Provisional application No. 61/621,217, filed on Apr. 6, 2012.

(51) Int. Cl.
*H02K 41/02*  (2006.01)
(52) U.S. Cl.
USPC ..................... 310/12.01; 310/12.15
(58) Field of Classification Search
USPC ............................ 310/12.01–12.33
See application file for complete search history.

(56) References Cited

U.S. PATENT DOCUMENTS

| | | | |
|---|---|---|---|
| 3,967,146 A * | 6/1976 | Howard ........................ | 310/80 |
| 4,011,477 A * | 3/1977 | Scholin ........................ | 310/80 |
| 6,552,450 B2 * | 4/2003 | Harty et al. ..................... | 310/16 |
| 6,598,621 B1 * | 7/2003 | Wygnanski .............. | 137/624.18 |
| 7,557,473 B2 * | 7/2009 | Butler ............................ | 310/20 |
| 2001/0004171 A1 * | 6/2001 | Griswold ........................ | 310/30 |
| 2007/0278863 A1 | 12/2007 | Yamamoto et al. | |
| 2011/0156619 A1 * | 6/2011 | Nomura ........................ | 318/135 |
| 2012/0007449 A1 * | 1/2012 | Gosvener ........................ | 310/23 |
| 2012/0007704 A1 | 1/2012 | Nerl | |
| 2012/0200178 A1 | 8/2012 | Kimura | |
| 2012/0310111 A1 | 12/2012 | Shachar et al. | |
| 2014/0034080 A1 * | 2/2014 | Paquet et al. ................. | 132/286 |

* cited by examiner

*Primary Examiner* — Thanh Lam
(74) *Attorney, Agent, or Firm* — Myertons Hood Kivlin Kowert & Goetzel, P.C.; Jeffrey C. Hood; Mark S. Williams

(57) ABSTRACT

Magnetic linear actuator (MLA) and use. The MLA includes a driver portion with motor and rotating mount with a first magnet (M1) having poles aligned in a plane, and an actuator portion, having a frame with a second magnet (M2) proximate to a first end of the frame with a specified pole facing the frame's center, and a third magnet (M3) proximate to a second end of the frame with the specified pole facing the frame's center. The frame holds M2 and M3 collinear with M1, in the plane, and on opposite sides of the M1, and is constrained to move along an axis collinear with M1, M2, and M3. During operation, the motor rotates M1 through a first orientation where M1 attracts M2 and repels M3, then a second orientation where M1 repels M2 and attracts M3, in response to which the frame moves back and forth, e.g., reciprocates.

20 Claims, 5 Drawing Sheets a driver portion, including a rotating mount with a first magnet with poles aligned in a plane, a motor, coupled to and configured to rotate the rotating mount, thereby rotating the first magnet, and an actuator portion, including a non-magnetic frame, with a second magnet, affixed to the frame proximate to a first end of the frame, with a specified pole facing the frame's center, and a third magnet, affixed to the frame proximate to a second end of the frame, with the specified pole facing the frame's center, where the frame is configured to hold the second and third magnets substantially collinear with the first magnet, in the plane, and on opposite sides of the first magnet, and where the frame is constrained to reciprocal movement along an axis substantially collinear with the first, second, and third magnets
202 the motor of the driver portion rotates the rotating mount, thereby repeatedly rotating the first magnet through a first orientation where the first magnet attracts the second magnet and repels the third magnet, then a second orientation where the first magnet repels the second magnet and attracts the third magnet
204 in response to the first orientation, the actuator portion moves along the axis in a first direction
206 in response to the second orientation, the actuator portion moves along the axis in a second direction, opposite the first direction
208 in response to repeatedly rotating the first magnet, the actuator portion moves back and forth along the axis in a reciprocating manner
210

Figure 2

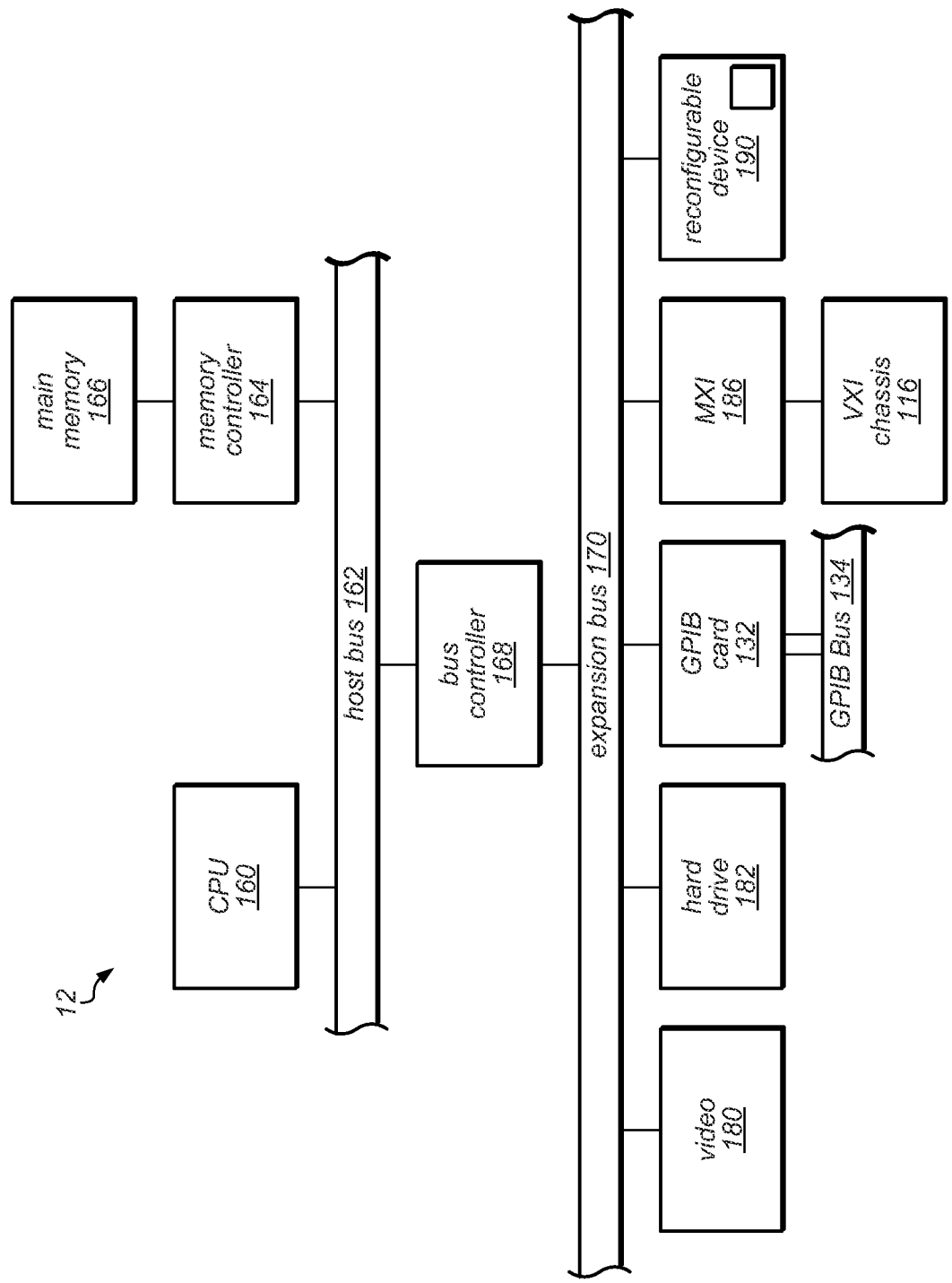

MAGNETIC LINEAR ACTUATOR

PRIORITY DATA

This application claims benefit of priority to U.S. Provisional Application Ser. No. 61/621,217, titled "Magnetic Linear Actuator", filed Apr. 6, 2012, whose inventor is David E. Wilson, and which is hereby incorporated by reference in its entirety as though fully and completely set forth herein.

FIELD OF THE INVENTION

The present invention relates to the field of actuators, and more specifically, to a magnetic linear actuator for generating reciprocal motion.

DESCRIPTION OF THE RELATED ART

There are numerous applications that utilize linear actuators, including for example, industrial control and manufacturing, as well as actuator devices, e.g., devices that utilize linear actuation, such as, for example, assembly line devices that push items onto or off of the assembly line, valves, automatic levers or switches, and so forth.

However, prior art linear actuators generally rely on a material, i.e., mechanical, coupling between the driver and the actuator, which can make manufacture, calibration, and control of the linear actuator for different conditions difficult, inflexible, and unwieldy. Moreover, such physical linkage may make the actuator subject to catastrophic failure if actuator movement is thwarted.

Thus, improved linear actuators are desired.

SUMMARY OF THE INVENTION

Various embodiments of a magnetic actuator are presented below.

The magnetic linear actuator, which may be referred to herein simply as "the linear actuator", may include an actuator portion, and a driver portion. The driver portion may include a rotating mount that includes a first magnet with poles aligned in a plane. The driver portion may further include a motor, coupled to and configured to rotate the rotating mount, thereby rotating the first magnet. Note that the magnet is positioned on or in the rotating mount such that when the motor rotates the rotating mount, the first magnet rotates about the axis of rotation of the rotating mount. It should be noted that in different embodiments, the first magnet may be any of various types, so long as its poles are generally in opposite directions.

In one embodiment, the actuator portion includes a frame. The frame is preferably non-magnetic. As used herein, "non-magnetic" means "not significantly affected by magnetic fields", and applies to such materials as plastics, wood, various metals, such as copper and aluminum, and so forth. In some embodiments, the frame may also be non-conducting, i.e., electrically non-conducting. The actuator portion may further include a second magnet, affixed to the frame proximate to a first end of the frame, with a specified pole facing the frame's center, and a third magnet, affixed to the frame proximate to a second end of the frame, with the specified pole facing the frame's center. In other words, the second and third magnets are at either end of the frame and in opposition to each other, pole-wise.

When assembled or during operation, the frame may be configured to hold the second and third magnets substantially collinear with the first magnet, in the plane, and on opposite sides of the first magnet. Said another way, the frame preferably has an empty interior (framed by the frame) that accommodates the driver portion of the magnetic linear actuator, and maintains a collinear relationship between the first, second, and third magnets, with the first magnet between the second and third magnets. Note that in other embodiments, the frame may have any other shape as desired, so long as it provides this geometric relationship of the magnets. The frame may be constrained to movement, e.g., reciprocal movement, along an axis substantially collinear with the first, second, and third magnets.

In some embodiments, the magnetic linear actuator further includes a housing or cover. The housing may at least partially enclose the actuator portion, and may be aligned with the axis along which the frame moves. The frame may be constrained to movement along an axis substantially collinear with the first, second, and third magnets by the housing. In other words, the housing may operate as a physical guide for the frame, only allowing the frame to move back and forth along the axis. In some embodiments, the housing may include sides parallel to the axis, e.g., side-walls, that provide this guide functionality. For example, the housing and frame may be rectilinear, with longitudinal sides that slide (or roll, with suitable bearings or rollers) with respect to each other. In another embodiment, the housing may be cylindrical or tubular, where, for example, the width of the cylinder (or tube) may be just large enough to accommodate the frame (and any bearings or rollers). Additionally, or alternatively, the housing may include rails or guides that keep the frame oriented properly and constrain its movement to be along the axis. It should be noted, however, that in other embodiments, the housing may have any of a variety of shapes, e.g., hexagonal cylinder, triangular cylinder, "V" shaped trough, or an upside down version of such, among others. As with the frame, in some embodiments, the housing may be non-magnetic and/or non-conducting.

In one embodiment, the housing may be open at a first end, thereby allowing the actuator portion to extend from the housing in a first direction along the axis, and may be closed at a second end, thereby preventing the actuator portion from extending from the housing in a second direction along the axis (i.e., opposite from the first direction). Alternatively, in other embodiments, the housing may be open at the first end, thereby allowing the actuator portion to extend from the housing in the first direction; and also open at the second end, thereby allowing the actuator portion to extend from the housing in the second direction. In other words, the housing may permit the frame/actuator to extend beyond the housing in both directions.

More generally, in various embodiments, any of the sides (including the top or bottom) of the housing may be open or closed as desired, so long as the intended functionality of the actuator is facilitated.

In some embodiments, the housing may include an opening large enough to allow a shaft of the motor and the first magnet to be inserted into the housing for placement of the rotating mount and the first magnet within the actuating frame. Thus, for example, the housing have an open bottom that accommodates the motor shaft, or may have a closed bottom, but with a hole or slot for this purpose. Alternatively, in one embodiment, the motor may be attached to the housing, e.g., on the inside of the top or bottom surface of the housing, or even one or both of the sides, depending on the relative orientation of the frame. More generally, the motor (and rotating mount), frame, and/or housing may be of any shape or form desired, so long as the geometrical relationships between the three magnets described herein are maintained.

During operation, the driver portion may rotate the rotating mount, thereby repeatedly rotating the first magnet through a first orientation where the first magnet attracts the second magnet and repels the third magnet, then a second orientation where the first magnet repels the second magnet and attracts the third magnet.

In response to the first orientation, the actuator portion may move along the axis in a first direction. More specifically, in one embodiment, when the first magnet presents its south pole to the second magnet, whose north pole is facing the center of frame, and presents its north pole to the third magnet, whose south pole is facing the center of the frame, the actuator portion (frame and magnets) is subject to forces in the first direction (with respect to the first magnet) which operate to move the second magnet towards the first magnet, and the third magnet away from the first magnet, respectively. In other words, the actuator portion moves in the first direction (while the driver portion remains at rest).

In response to the second orientation, the actuator portion may move along the axis in a second direction, opposite the first direction. More specifically, in one embodiment, when the first magnet presents its north pole to the second magnet, whose north pole is facing the center of frame, and presents its south pole to the third magnet, whose south pole is facing the center of the frame, the actuator portion (frame and magnets and) is subject to forces in the second direction which operate to move the second magnet away from the first magnet, and the third magnet towards the first magnet. In other words, the actuator portion moves to in the second direction (while the driver portion remains at rest).

In response to said repeatedly rotating the first magnet, the actuator portion may move back and forth along the axis in a reciprocating manner. In other words, as the first magnet rotates, the actuator portion may travel back and forth along the axis in response to the magnetic forces between the rotating first magnet and the second and third magnets, and thus, the actuator portion. In other embodiments, the first magnet may be rotated (by the motor) some specified amount then stopped, thereby moving the actuator portion a specified distance, or to a particular linear position, along the axis. Similarly, in some embodiments, the first magnet may be rotated through a sequence of specified angles, thereby moving the actuator portion through a corresponding sequence of positions along the axis.

Thus, various embodiments of the above-described magnetic linear actuator may be used to generate linear motion, without requiring a mechanical coupling between a driver portion of the linear actuator and an actuator portion of the linear actuator.

BRIEF DESCRIPTION OF THE DRAWINGS

A better understanding of the present invention can be obtained when the following detailed description of the preferred embodiment is considered in conjunction with the following drawings, in which:

FIG. 2 illustrates a method of operation for a magnetic linear actuator, according to one embodiment;

FIG. 5 is an exemplary block diagram of the computer system of FIG. 4.

Figure 1:
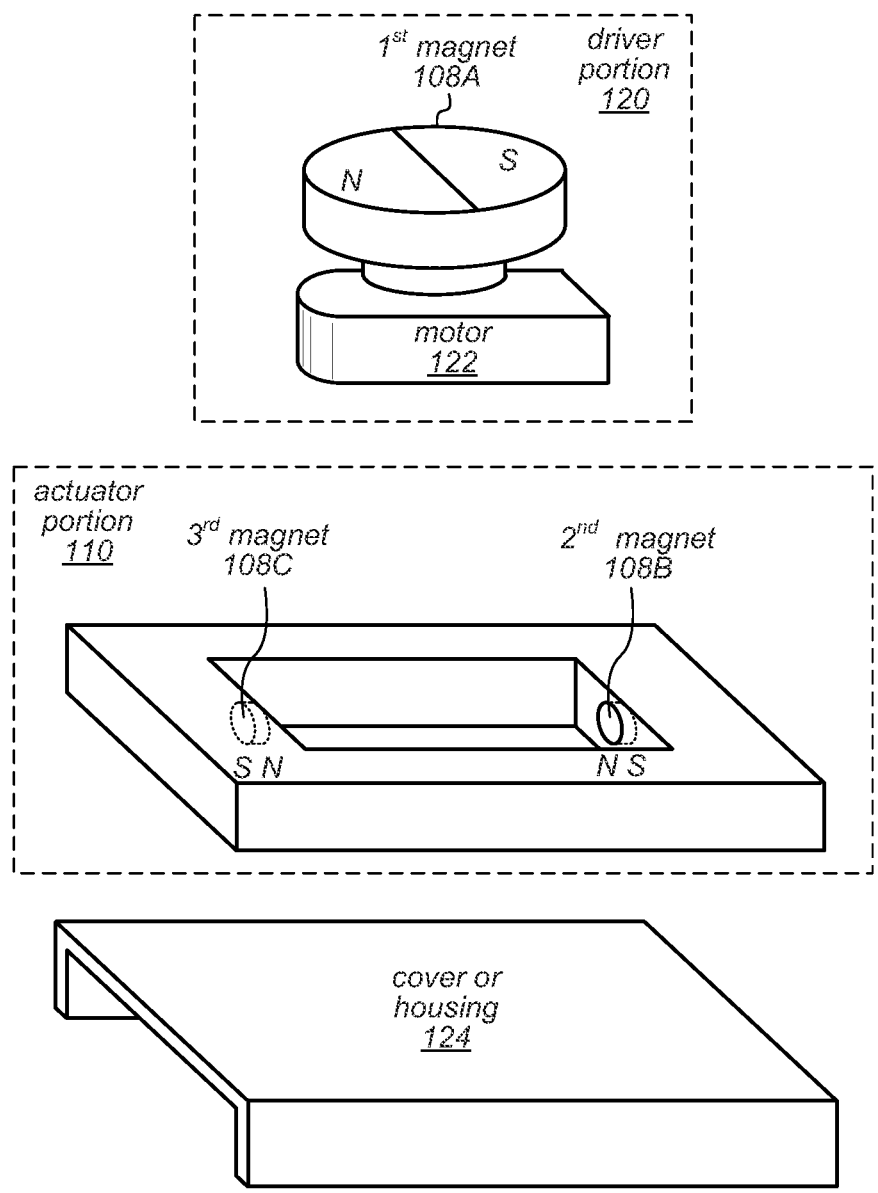
FIG. 1 illustrates a magnetic linear actuator, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/621,217, titled "Magnetic Linear Actuator", filed Apr. 6, 2012.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Magnetic Linear Actuator

FIG. 1 illustrates an exemplary magnetic linear actuator, according to one embodiment. Note that the particular components shown are meant to be exemplary only and that each component is not limited to any particular form or appearance. Additionally, in some embodiments, various of the components may be combined or integrated into one component, as desired. Conversely, in some embodiments, various of the components shown may be implemented with multiple parts, i.e., sub-components, as desired.

As FIG. 1 shows, in some embodiments, the magnetic linear actuator, which may be referred to herein simply as "the linear actuator" or "the actuator", may include an actuator portion 110, and a driver portion 120. In the embodiment shown in FIG. 1, the driver portion 120 includes a rotating mount 124 that includes a magnet 108A, e.g., a first magnet, with poles aligned in a plane, as indicated by the N (north) and S (south) labels. The driver portion may further include a motor 122, coupled to and configured to rotate the rotating mount 124, thereby rotating the first magnet 108A in the plane. Note that the magnet 108A is positioned on or in the rotating mount 124 such that when the motor rotates the rotating mount 124, the first magnet 108A rotates about the axis of rotation of the rotating mount 124. It should be noted that in different embodiments, the first magnet 108A may be any of various types, so long as its poles (N-S) are generally in opposite directions. For example, as illustrated in FIG. 1, in one exemplary embodiment, the first magnet 108A may be or include a diametrically magnetized ring magnet, e.g., a magnetic disk where half the disk (e.g., 0-180 degrees) is the north pole (N), and the other half (e.g., 181-0 degrees) is the south pole (S). In another exemplary embodiment, the first magnet 108A may be or include a bar magnet, with north and south ends, or any type of magnet (or magnets) with oppositely oriented poles.

In various embodiments, power may be provided to the motor 122 via any of a variety of means, e.g., batteries, direct current (e.g., via a transformer and cable), alternating current (via a cable), or even a hand crank, among others.

In the embodiment shown, the actuator portion 110 includes a frame 112. The frame is preferably non-magnetic, e.g., may be non-ferrous. As used herein, "non-magnetic" means "not significantly affected by magnetic fields", and applies to such materials as plastics, wood, various metals, such as copper and aluminum, and so forth. In some embodiments, the frame may also be non-conducting, i.e., electrically non-conducting. The actuator portion 110 may further include a second magnet 108B, affixed to the frame proximate to a first end of the frame, with a specified pole facing the frame's center, and a third magnet 108C, affixed to the frame proximate to a second end of the frame, with the specified pole facing the frame's center. In other words, the second and third magnets are at either end of the frame and in opposition to each other, pole-wise.

When installed, e.g., when assembled or during operation, the frame may be configured to hold the second and third magnets substantially collinear with the first magnet, in the plane, and on opposite sides of the first magnet. Said another way, the frame preferably has an empty interior (framed by the frame) that accommodates the driver portion of the magnetic linear actuator, and maintains a collinear relationship between the first, second, and third magnets, with the first magnet between the second and third magnets. Note that in other embodiments, the frame may have any other shape as desired, so long as it provides this geometric relationship of the magnets. The frame may be constrained to movement, e.g., reciprocal movement, along an axis substantially collinear with the first, second, and third magnets.

Note that as used herein, the term "substantially collinear" means "collinear within a desired tolerance", where the desired tolerance depends on the application. For example, in one exemplary embodiment, substantially collinear means within 5 degrees of strict collinearity. In other exemplary embodiments, substantially collinear means within 2, 1, 0.5, or 0.1 degrees of strict collinearity. Of course, in further embodiments, any tolerance may be specified as desired, and the collinearity of the magnets may fall within that tolerance.

In some embodiments, the magnetic linear actuator further includes a housing or cover 124. The housing 124 may at least partially enclose the actuator portion 110, and may be aligned with the axis along which the frame 112 moves. The frame 112 may be constrained to movement, e.g., reciprocal movement, along an axis substantially collinear with the first, second, and third magnets by the housing 124. In other words, the housing may operate as a physical guide for the frame, only allowing the frame to move back and forth along the axis. In some embodiments, the housing may include sides parallel to the axis, e.g., side-walls, that provide this guide functionality. For example, the housing and frame may be rectilinear, with longitudinal sides that slide (or roll, with suitable bearings or rollers) with respect to each other (again, along the axis). In another embodiment, the housing may be cylindrical or tubular, where, for example, the width of the cylinder (or tube) may be just large enough to accommodate the frame (and any bearings or rollers). Additionally, or alternatively, the housing may include rails or guides that keep the frame oriented properly and constrain its movement to be along the axis. It should be noted, however, that in other embodiments, the housing may have any of a variety of shapes, e.g., hexagonal cylinder, triangular cylinder, "V" shaped trough, or an upside down version of such, among others. As with the frame, in some embodiments, the housing 124 may be non-magnetic and/or non-conducting.

In one embodiment, the housing may be open at a first end, thereby allowing the actuator portion to extend from the housing in a first direction along the axis, and may be closed at a second end, thereby preventing the actuator portion from extending from the housing in a second direction along the axis (i.e., opposite from the first direction). Alternatively, in other embodiments, the housing may be open at the first end, thereby allowing the actuator portion to extend from the housing in the first direction; and also open at the second end, thereby allowing the actuator portion to extend from the housing in the second direction. In other words, the housing may permit the frame/actuator to extend beyond the housing in both directions.

More generally, in various embodiments, any of the sides (including the top or bottom) of the housing may be open or closed as desired, as long as the intended functionality of the actuator is facilitated.

In some embodiments, the housing may include an opening large enough to allow a shaft of the motor and the first magnet to be inserted into the housing for placement of the rotating mount and the first magnet within the actuating frame. Thus, for example, in one embodiment, the housing may have an open bottom that accommodates the motor shaft, or may have a closed bottom, but with a hole or slot for this purpose. Alternatively, in one embodiment, the motor may be attached to the housing, e.g., on the inside of the top or bottom surface of the housing, or even one or both of the sides, depending on the relative orientation of the frame. More generally, the motor (and rotating mount), frame, and/or housing may be of any shape or form desired, so long as the geometrical relationships between the three magnets described herein are maintained.

The motor of the driver portion may be configured to rotate the rotating mount, thereby repeatedly rotating the first magnet through a first orientation where the first magnet attracts the second magnet and repels the third magnet, then a second orientation where the first magnet repels the second magnet and attracts the third magnet. The actuator portion may be configured to move along the axis in a first direction in response to the first orientation, and to move along the axis in a second direction, opposite the first direction, in response to the second orientation. Accordingly, the actuator portion may be configured to move back and forth along the axis in a reciprocating manner in response to repeatedly rotating the first magnet.

Figure 3A:
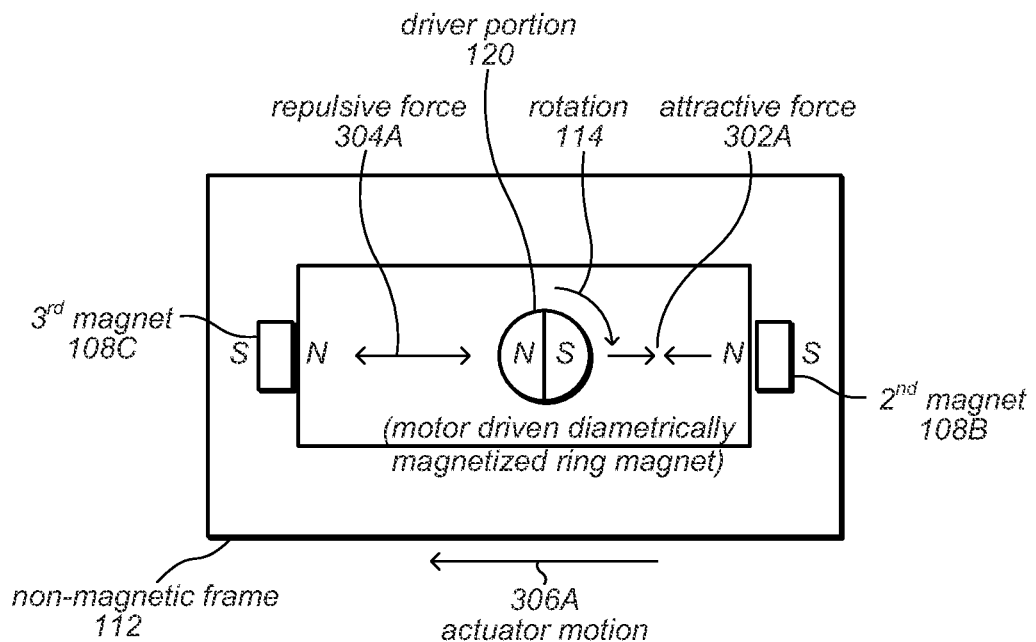
FIGS. 3A and 3B illustrate a magnetic linear actuator and its operation, according to one embodiment.
Figure 3B:
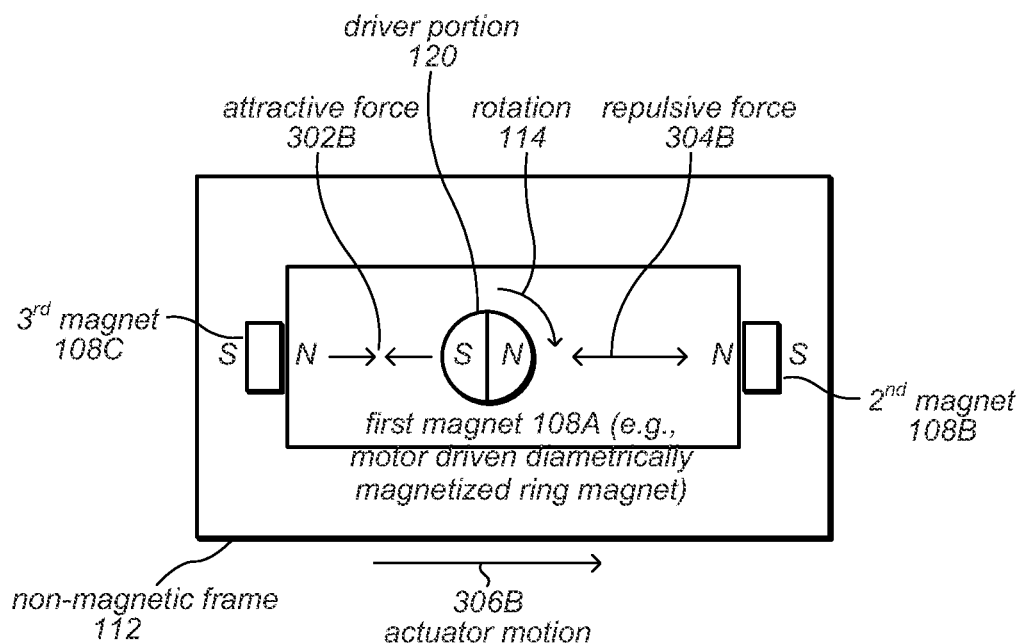

Embodiments of the assembled magnetic linear actuator and its operation are now described with reference to FIGS. 2, 3A and 3B.

FIG. 2—Method of Operation of a Magnetic Linear Actuator

FIG. 2 illustrates a method of operation for a magnetic linear actuator, according to one embodiment. The method shown in FIG. 2 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 202, a magnetic linear actuator may be provided. As described above with reference to FIG. 1, the magnetic linear actuator may include an actuator portion 110, and a driver portion 120, where the driver portion 120 may include a rotating mount 124 that includes a magnet 108A, e.g., a first magnet, where the magnet 108A is positioned on or in the rotating mount 124 such that when the motor rotates the rotating mount 124, the first magnet 108A rotates about the axis of rotation of the rotating mount 124. As also described above, the actuator portion 110 may include a frame 112, which may include a second magnet 108B, affixed to the frame proximate to a first end of the frame, with a specified pole, e.g., N, facing the frame's center, and a third magnet 108C, affixed to the frame proximate to a second end of the frame, with the specified pole facing the frame's center, i.e., the second and third magnets are at either end of the frame and in opposition to each other, pole-wise.

The frame may be configured to hold the second and third magnets substantially collinear with the first magnet, in the plane, and on opposite sides of the first magnet. Said another way, the frame preferably has an empty interior (framed by the frame) that accommodates the driver portion of the magnetic linear actuator, and maintains a collinear relationship between the first, second, and third magnets, with the first magnet between the second and third magnets.

As further described above, in some embodiments, the magnetic linear actuator may also include a housing that at least partially encloses the actuator portion, and may be aligned with the axis along which the frame moves. The frame may be constrained to the reciprocal movement along an axis substantially collinear with the first, second, and third magnets by the housing.

In 204, the driver portion may rotate the rotating mount, thereby repeatedly rotating the first magnet 108A through a first orientation where the first magnet 108A attracts the second magnet 108B and repels the third magnet 108C, then a second orientation where the first magnet 108A repels the second magnet 108B and attracts the third magnet 108C. FIG. 3A illustrates an exemplary embodiment illustrating an orientation of the first magnet 108A where, the first magnet 108A's north pole (N) exerts a repulsive force 304A on the frame due to the south pole (S) of third magnet 108 and where the first magnet 108A's south pole (S) exerts an attractive force 302A on the frame due to the north pole (N) of third magnet 108C.

In 206, in response to the first orientation, the actuator portion 110 may move along the axis in a first direction. More specifically, per 204, and as illustrated in FIG. 3A, in one embodiment, when the first magnet 108A presents its south pole to the second magnet 108B, whose north pole is facing the center of frame 112, and presents its north pole to the third magnet 108, whose south pole is facing the center of the frame 112, the actuator portion (frame and magnets 108B and 108C) is subject to forces to the left (with respect to the first magnet 108A in FIG. 3A), represented by attractive force 302A and repulsive force 304A, which operate to move the second magnet 108B towards the first magnet 108A, and the third magnet 108C away from the first magnet 108A, respectively. In other words, the actuator portion 110 moves to the left (while the driver portion 120 remains at rest), as indicated by actuator motion 306A.

In 208, in response to the second orientation, the actuator portion 110 may move along the axis in a second direction 306B, opposite the first direction 306A. More specifically, also per 204, and as illustrated in FIG. 3B, in one embodiment, when the first magnet 108A presents its north pole to the second magnet 108B, whose north pole is facing the center of frame 112, and presents its south pole to the third magnet 108, whose south pole is facing the center of the frame 112, the actuator portion (frame and magnets 108B and 108C) is subject to forces in the second direction, e.g., to the right in FIG. 3B, represented by attractive force 302B and repulsive force 304B, which operate to move the second magnet 108B away from the first magnet 108A, and the third magnet 108C towards the first magnet 108A. In other words, the actuator portion 110 moves to the right (while the driver portion 120 remains at rest), as indicated by actuator motion 306B. It should be noted that the polarities of the magnets may be reversed, and the linear actuator operates in an analogous manner, as is understood by those of skill in the art. In other words, the particular orientation of the second and third magnets shown in the present figures is meant to be exemplary only, and in other embodiments, these magnet polarities may be reversed.

In 210, in response to said repeatedly rotating the first magnet 108A, the actuator portion may move back and forth along the axis, e.g., in a reciprocating manner. In other words, as the first magnet 108A rotates, the actuator portion may travel back and forth along the axis in response to the magnetic forces between the rotating first magnet and the second and third magnets, and thus, the actuator portion. In one exemplary embodiment, the diametrically magnetized rotating magnet may be oriented so that it attracts one of the frame magnets while repelling the other. There are two such orientations, 180 degrees apart. Note that in either orientation, the repelling and attracting orientation will hold the frame in that orientation, thereby creating an inherent latching capability. These latched positions do not require external power to hold the actuation frame in (either) position. Said another way, rotating the rotating mount may further include stopping the rotating at the first or second orientation, and in response to stopping the rotation, the actuator portion may latch at a first or second position corresponding respectively to the first or second orientation. This latching may not require external power to hold the actuator portion at the first or second position.

In other embodiments, the first magnet may be rotated (by the motor) some specified amount then stopped, thereby moving the actuator portion a specified distance, or to a particular linear position, along the axis. Similarly, in some embodiments, the first magnet may be rotated through a sequence of specified angles, thereby moving the actuator portion through a corresponding sequence of positions along the axis.

In a more general embodiment of the above method, a first magnet may be rotated through a first orientation, where the first magnet has poles aligned in a plane, and where the first magnet is in between and substantially collinear with second and third magnets. The second magnet may be affixed to a non-magnetic frame proximate to a first end of the frame, with a specified pole facing the first magnet, and the third magnet may be affixed to the frame proximate to a second end of the frame, with the specified pole facing the first magnet. The frame may be constrained to reciprocal movement along an axis substantially collinear with the first, second, and third magnets, and where in the first orientation the first magnet attracts the second magnet and repels the third magnet. The frame may move along the axis in a first direction in response to rotating the first magnet through the first orientation. The first magnet may then be rotated through a second orientation, where the second orientation is anti-parallel to the first orientation, and where in the second orientation the first magnet repels the second magnet and attracts the third magnet. The frame may move along the axis in a second direction, opposite the first direction, in response to rotating the first magnet through the second orientation. Rotating the first magnet through the first orientation and rotating the first magnet through the second orientation may be repeated in an iterative manner, and the frame may move back and forth along the axis in a reciprocating manner in response to this repeating.

Note that any of the features and embodiments disclosed herein may be used in any combinations as desired. Various exemplary embodiments are now described, although it should be noted that the embodiments disclosed are meant to be exemplary only, and are not intended to limit the actuator or actuator components to any particular form or appearance.

Exemplary Embodiment

In one embodiment, the magnetic linear actuator comprises a magnetic latching linear actuator that produces reciprocating (in/out) linear motion through the action of a rotating diametrically magnetized ring magnet as it attracts and repels two magnets located at the end of a non-conducting nonferrous rectangular frame. As the diametrically magnetized ring magnet is rotated, e.g., via an electric motor, the orientation of the poles of the magnet (with respect to elements perpendicular to the rotational axis) may shift from north to south in a repeating manner. Two additional magnets, which may be referred to as "fixed frame magnets" may be embedded in the non-conductive nonferrous rectangular frame such that the poles of these magnets repel each other. That is, either the north poles of the fixed frame magnets are facing each other, or the south poles of the magnets are facing each other.

In the case where both north poles are facing each other, the ring magnet may rotate such that in one instance, the north pole of the ring magnet repels one of the fixed frame magnets, and concurrently, the south pole of the ring magnet attracts the other fixed frame magnet as the ring magnet's south pole attracts that fixed frame magnet's north pole. The combined repulsion and attraction thus exerts forces on the non-conductive nonferrous frame. The frame may be allowed to slide over or by the ring magnet until the edge of the frame and the fixed frame magnet (moving toward the ring magnet) meets the ring magnet.

The nonferrous frame may be kept in place by a nonferrous cover (or housing). The frame may slide in and out of the cover. In one embodiment, the cover may surround the frame on at least three sides. It may cover the top of the sliding frame to keep it in place over the rotating ring magnet and it may cover the two sides of the frame parallel to the motion of the frame. At least one end of the frame may be open to allow the frame to actuate linearly. In some embodiments, both ends of the cover may be open to allow the frame to actuate (move) in and out of both ends. The underside of the cover may be closed or open. In the case where it is closed, a hole may be provided in the cover to allow a motor shaft and the ring magnet to insert into the cover and align in place with the actuating frame.

The above description is meant to be exemplary only. Further exemplary embodiments are now described.

Further Exemplary Embodiments

While the above describes an exemplary embodiment of the magnetic linear actuator, it should be noted that numerous other embodiments are also contemplated.

For example, as noted above, the frequency of rotation of the rotating mount 124 determines the frequency of the resultant actuation. There are various ways in which the amplitude and/or speed of the motion, or force of the actuator may be specified or controlled, based on setting or modifying various attributes of the device, such as, for example, the strength of the magnets, the distance of closest approach of the magnets, and the structure and dimensions of the frame, among others.

For example, in one embodiment, the frame may include extensible longitudinal (along the axis of motion) members which may be adjusted as desired, e.g., the frame may be shortened or elongated as desired. For example, in one exemplary embodiment, the members may be "telescoped", where one part of each member slides into another part, and the member has means for fixing or locking the relative position of the two parts, e.g., screw locks, clamps, etc.

In one embodiment, movement of the frame in the first direction may be constrained by abutment of the third magnet or the second end of the frame with the first magnet, and/or movement of the frame in the second direction may be constrained by abutment of the second magnet or the first end of the frame with the first magnet. Alternatively, or additionally, additional stopping elements may be included that limit the motion of the actuator. For example, the housing may include stops, e.g., on inside surfaces along which the frame slides or rolls, which may stop the frame at specified positions. In some embodiments, these stops may be adjustable. Alternatively, or additionally, as noted above, in various embodiments, the housing may have open or closed ends that may allow or restrict the motion of the actuator portion.

As noted above, in some embodiments, the non-magnetic frame may be conductive, e.g., made from aluminum, which is non-magnetic, but electrically conductive. Accordingly, in one embodiment, the frame may create an electrical connection with an external electrical contact, but may be insulated from the motor because it is actuated magnetically, and thus may be used as an isolated relay.

Figure 4:
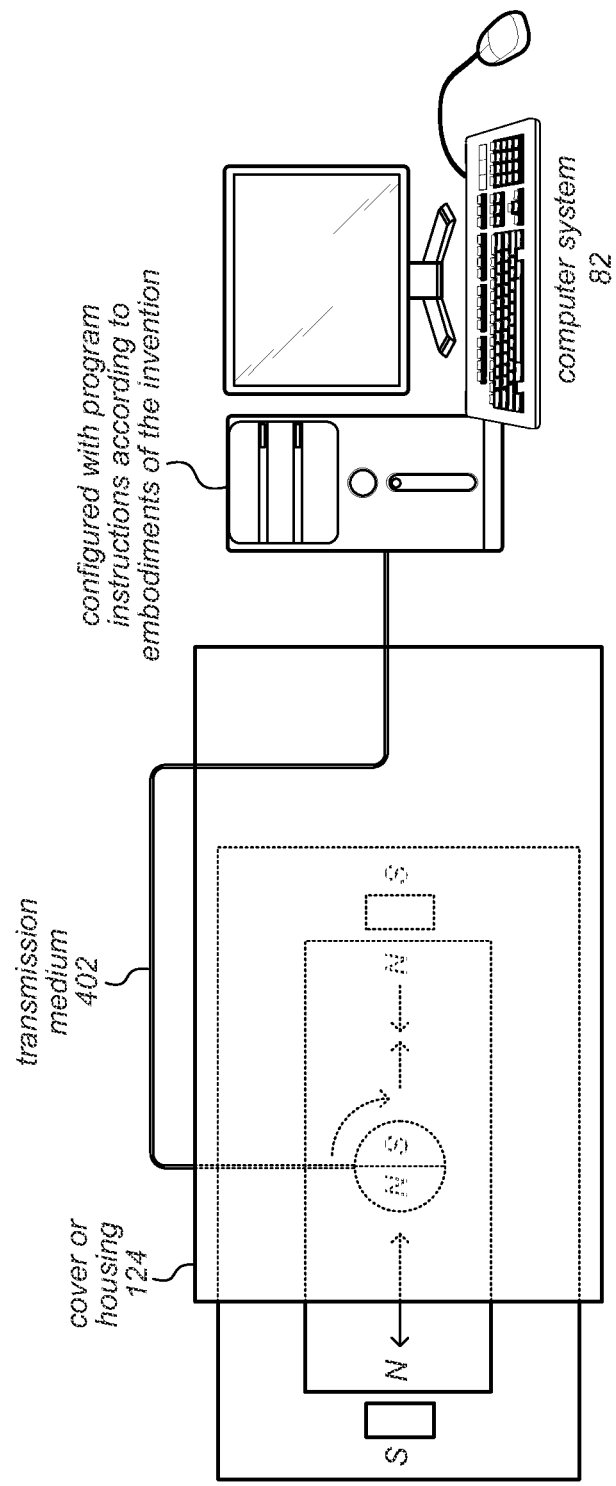
FIG. 4 illustrates a computer controlled magnetic linear actuator, according to one embodiment.

FIG. 4—Computer Controlled Magnetic Linear Actuator

In some embodiments, the magnetic linear actuator may be controlled simply e.g., via a rheostat coupled to the motor. However, in other embodiments, the magnetic linear actuator may be coupled to a controller, i.e., a computer, and controlled thereby.

FIG. 4 illustrates one embodiment of a computer controlled magnetic linear actuator, where the magnetic linear actuator is coupled to a computer system 82 which is configured to execute a program instructions for controlling the magnetic linear actuator. In one embodiment, the driver portion may be configured to communicatively couple to a controller (a computer), where the driver portion is configured to receive signals from the controller specifying a rotation rate for the motor, the orientation of the first magnet, or a change in the orientation of the first magnet. The driver portion, and more specifically, the motor, may be configured to rotate accordingly in response to the received signals. For example, the program instructions may comprise one or more programs executable by the computer system 82 to control the frequency of rotation of the motor and/or the rotating mount, which determines the frequency of movement of the actuator portion. As another example, the one or more programs may be executable to control the orientation or change in orientation of the first magnet 108A (via the motor 122), and the actuator portion may move accordingly.

In some embodiments, the motor 122 may be a stepping motor, where the angle of rotation, and thus, the position of the actuator portion, may be controlled precisely. In other words, the motor, and thus, the actuator, may not be limited to iterative reciprocal movement, but may be able to be positioned at will, thus, providing a much greater variety of linear actuation, e.g., performing singular actuations, or specified sequences of actuation beyond simple reciprocating motion.

In some embodiments, the programs may be graphical programs developed under the LabVIEW™ graphical program development environment, provided by National Instruments Corporation, although any type of software may be used as desired.

As may be seen, the computer system 82 may include a display device configured to display a graphical user interface (GUI) for user configuration or control (or calibration) of the magnetic linear actuator via the computer system. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs which are executable to configure or control the magnetic linear actuator. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

In some embodiments, the computer system (or controller) may be coupled to the magnetic linear actuator via a network, such as the Internet, and thus may be configured or controlled remotely.

FIG. 5—Computer System Block Diagram

FIG. 5 is a block diagram representing one embodiment of the computer system 82 illustrated in FIG. 4. It is noted that any type of computer system configuration or architecture can be used as desired, and FIG. 5 illustrates a representative PC embodiment. It is also noted that the computer system may be a general purpose computer system, a computer implemented on a card installed in a chassis, an embedded device, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a program, e.g., a graphical program, configured to control the driver portion of the magnetic linear actuator, e.g., to control or modulate the frequency, and in some embodiments, the amplitude, of the generated motion. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 132 coupled to a GPIB bus 134, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a program, e.g., a graphical program, to the device 190 for execution of the program on the device 190. The deployed (graphical) program may take the form of graphical program instructions or data structures that directly represents the graphical program. Alternatively, the deployed program may take the form of text code (e.g., C code) generated from a graphical program. As another example, the deployed program may take the form of compiled code generated from either the graphical program or from text code that in turn may have been generated from a graphical program.

One particular benefit of embodiments of the magnetic linear actuator disclosed herein is its graceful response to thwarted motion. For example, actuators with mechanically coupled driver and actuator portions may fail ungracefully or even catastrophically if the actuator portion is not allowed to move while the driver is active, e.g., the mechanical coupling mechanism may break, the motor may burn out, etc. To avoid such failures, additional components may be required, e.g., a clutch, or other failure recovery or prevention means.

In contrast, with the magnetic force coupling described herein, if the actuator is kept from moving, the motor may be allowed to continue to rotate while the actuator remains fixed—the magnetic coupling may serve as a "shock absorber" for the system (the magnetic linear actuator), thus preventing damage to the linear actuator.

Thus, various embodiments of the above-described magnetic linear actuator may be used to generate reciprocating motion or linear actuation, without requiring a mechanical coupling between a driver portion of the magnetic linear actuator and an actuator portion of the magnetic linear actuator.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A magnetic linear actuator, comprising:
    a driver portion, comprising:
        a rotating mount, wherein the rotating mount comprises a first magnet with poles aligned in a plane;
        a motor, coupled to and configured to rotate the rotating mount, thereby rotating the first magnet; and
    an actuator portion, comprising:
        a frame, wherein the frame is non-magnetic;
        a second magnet, affixed to the frame proximate to a first end of the frame, with a specified pole facing the frame's center; and
        a third magnet, affixed to the frame proximate to a second end of the frame, with the specified pole facing the frame's center;
    wherein the frame is configured to hold the second and third magnets substantially collinear with the first magnet, in the plane, and on opposite sides of the first magnet;
    wherein the frame is constrained to reciprocal movement along an axis substantially collinear with the first, second, and third magnets;
    wherein the motor of the driver portion is configured to rotate the rotating mount, thereby repeatedly rotating the first magnet through:
        a first orientation wherein the first magnet attracts the second magnet and repels the third magnet; then
        a second orientation wherein the first magnet repels the second magnet and attracts the third magnet;
    wherein the actuator portion is configured to move along the axis in a first direction in response to the first orientation;
    wherein the actuator portion is configured to move along the axis in a second direction, opposite the first direction, in response to the second orientation; and
    wherein the actuator portion is configured to move back and forth along the axis in a reciprocating manner in response to said repeatedly rotating the first magnet.

2. The magnetic linear actuator of claim 1, wherein the first magnet comprises a diametrically magnetized ring magnet.

3. The magnetic linear actuator of claim 1, wherein the first magnet comprises a bar magnet.

4. The magnetic linear actuator of claim 1,
wherein the driver portion is configured to communicatively couple to a controller, wherein the driver portion is configured to receive signals from the controller specifying a rotation rate for the motor, the orientation of the first magnet, or a change in the orientation of the first magnet, and wherein the motor is configured to rotate accordingly in response to the received signals; and
wherein the actuator portion is configured to move based on the rotation of the motor.

5. The magnetic linear actuator of claim 1,
wherein movement of the frame in the first direction is constrained by abutment of the third magnet or the second end of the frame with the first magnet; or
wherein movement of the frame in the second direction is constrained by abutment of the second magnet or the first end of the frame with the first magnet.

6. The magnetic linear actuator of claim 1, further comprising:
a housing, at least partially enclosing the actuator portion, and aligned with the axis along which the frame moves; and
wherein the frame is constrained to the reciprocal movement along an axis substantially collinear with the first, second, and third magnets by the housing.

7. The magnetic linear actuator of claim 6,
wherein the housing is open at a first end, thereby allowing the actuator portion to extend from the housing in the first direction; and
wherein the housing is closed at a second end, thereby preventing the actuator portion from extending from the housing in the second direction.

8. The magnetic linear actuator of claim 6,
wherein the housing is open at a first end, thereby allowing the actuator portion to extend from the housing in the first direction; and
wherein the housing is open at a second end, thereby allowing the actuator portion to extend from the housing in the second direction.

9. The magnetic linear actuator of claim 6,
wherein the housing comprises an opening large enough to allow a shaft of the motor and the first magnet to be inserted into the housing for placement of the rotating mount and the first magnet within the actuating frame.

10. The magnetic linear actuator of claim 6, wherein the housing is rectilinear.

11. The magnetic linear actuator of claim 6, wherein the housing is cylindrical.

12. The magnetic linear actuator of claim 6, wherein the housing is non-magnetic.

13. The magnetic linear actuator of claim 6, wherein the housing or the frame are non-conducting.

14. The magnetic linear actuator of claim 1, wherein said rotating the rotating mount further comprises:
stopping said rotating at the first or second orientation; and
in response to said stopping, the actuator portion latching at a first or second position corresponding respectively to the first or second orientation;
wherein said latching does not require external power to hold the actuator portion at the first or second position.

15. A method for operating a magnetic linear actuator, the method comprising:
rotating a first magnet through a first orientation, wherein the first magnet has poles aligned in a plane, wherein the first magnet is in between and substantially collinear with second and third magnets, wherein the second magnet is affixed to a non-magnetic frame proximate to a first end of the frame, with a specified pole facing the first magnet, and wherein the third magnet is affixed to the frame proximate to a second end of the frame, with the specified pole facing the first magnet, wherein the frame is constrained to reciprocal movement along an axis substantially collinear with the first, second, and third magnets, and wherein in the first orientation the first magnet attracts the second magnet and repels the third magnet;
in response to said rotating the first magnet through the first orientation, the frame moving along the axis in a first direction;
rotating the first magnet through a second orientation, wherein the second orientation is anti-parallel to the first orientation, and wherein in the second orientation the first magnet repels the second magnet and attracts the third magnet;
in response to said rotating the first magnet through the second orientation, the frame moving along the axis in a second direction, opposite the first direction;
repeating said rotating the first magnet through the first orientation and said rotating the first magnet through the second orientation in an iterative manner;
in response to said repeating, moving the frame back and forth along the axis in a reciprocating manner.

16. The method of claim 15, wherein the first magnet comprises a diametrically magnetized ring magnet or a bar magnet.

17. The method of claim 15,
wherein the first magnet is comprised in a driver portion of the magnetic linear actuator;
wherein the driver portion further comprises a rotating mount to which the first magnet is affixed, and a motor coupled to and configured to rotate the rotating mount, thereby rotating the first magnet;
wherein the driver portion is communicatively coupled to a controller, the method further comprising:
receiving, by the driver portion, signals from the controller specifying a rotation rate for the motor, the orientation of the first magnet, or a change in the orientation of the first magnet;
rotating the first magnet accordingly in response to the received signals, via the motor; and
moving the frame based on said rotating the first magnet accordingly.

18. The method of claim 15,
wherein movement of the frame in the first direction is constrained by abutment of the third magnet or the second end of the frame with the first magnet; or
wherein movement of the frame in the second direction is constrained by abutment of the second magnet or the first end of the frame with the first magnet.

19. The method of claim 15, wherein the frame is constrained to reciprocal movement along an axis substantially collinear with the first, second, and third magnets by a housing that at least partially encloses the frame, and is aligned with the axis along which the frame moves.

20. The method of claim 15, further comprising:
stopping rotation of the first magnet at the first or second orientation; and in response to said stopping, the frame latching at a first or second position corresponding respectively to the first or second orientation;

wherein said latching does not require external power to hold the frame at the first or second position.

* * * * *